United States Patent
Belussi et al.

(10) Patent No.: US 11,418,432 B1
(45) Date of Patent: Aug. 16, 2022

(54) AUTOMATED COMMUNICATION FLOW DISCOVERY AND CONFIGURATION IN A SOFTWARE DEFINED NETWORK

(71) Applicant: Schweitzer Engineering Laboratories, Inc., Pullman, WA (US)

(72) Inventors: Paul A. Belussi, Lutz, FL (US); Rhett Smith, Odessa, FL (US); Kylan T. Robinson, Pullman, WA (US); Lance G. Dice, Lewiston, ID (US); Glenn C. Bethmann, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 6 days.

(21) Appl. No.: 17/237,468

(22) Filed: Apr. 22, 2021

(51) Int. Cl.
  *H04L 45/00* (2022.01)
  *H04L 45/64* (2022.01)
  *H04L 45/302* (2022.01)

(52) U.S. Cl.
  CPC ............ *H04L 45/38* (2013.01); *H04L 45/306* (2013.01); *H04L 45/56* (2013.01); *H04L 45/64* (2013.01)

(58) Field of Classification Search
  CPC ....... H04L 45/00; H04L 45/38; H04L 45/306; H04L 45/56; H04L 45/64; H04L 45/645; H04L 45/655; H04L 47/24; H04L 47/2441; H04L 47/2483
  See application file for complete search history.

(56) References Cited

U.S. PATENT DOCUMENTS

| | | |
|---|---|---|
| 6,747,957 B1 | 6/2004 | Pithawala |
| 7,218,632 B1 | 5/2007 | Bechtolsheim |
| 7,376,831 B2 | 5/2008 | Kollmyer |
| 7,872,983 B2 | 1/2011 | Lai |
| 8,553,544 B2 | 10/2013 | Lai |
| 8,800,044 B2 | 8/2014 | Raad |
| 9,038,151 B1 | 5/2015 | Chua |
| 9,237,129 B2 | 1/2016 | Ling |
| 9,286,171 B2 | 3/2016 | Cardona |
| 9,432,255 B1 | 8/2016 | Hasan |

(Continued)

FOREIGN PATENT DOCUMENTS

CN    104639328 B  *  4/2018

*Primary Examiner* — Mohamed A Kamara
(74) *Attorney, Agent, or Firm* — Jared L. Cherry

(57) ABSTRACT

The present disclosure pertains to systems and methods for automating the configuration of a software defined network ("SDN"). In one embodiment, a system may include a first communication host and a second communication host configured to transmit information to the first communication host. A network may provide communication between the first communication host and the second communication host using a plurality of network devices. An SDN controller in communication with the network may include an approved service subsystem to match the communication with an approved service. The SDN controller may also include an analysis subsystem configured to identify a communication flow corresponding to information transmitted by the second communication host to the first communication host. A traffic routing subsystem of the SDN controller may create the communication flow identified by the analysis subsystem between the second communication host and the first communication host.

22 Claims, 5 Drawing Sheets

(56) References Cited

U.S. PATENT DOCUMENTS

| | | |
|---|---|---|
| 9,432,380 B2 | 8/2016 | Margalit |
| 9,680,588 B2 | 6/2017 | Connolly |
| 9,686,125 B2 | 6/2017 | Smith |
| 9,769,060 B2 | 9/2017 | Dearien |
| 9,923,779 B2 | 3/2018 | Berner |
| 2002/0172157 A1 | 11/2002 | Rhodes |
| 2003/0112821 A1 | 6/2003 | Cleveland |
| 2003/0125924 A1 | 7/2003 | Lines |
| 2003/0133443 A1 | 7/2003 | Klinker |
| 2003/0188159 A1 | 10/2003 | Josset |
| 2005/0025141 A1 | 2/2005 | Chao |
| 2005/0078672 A1 | 4/2005 | Caliskan |
| 2005/0192008 A1 | 9/2005 | Desai |
| 2008/0005558 A1 | 1/2008 | Hadley |
| 2008/0080384 A1 | 4/2008 | Atkins |
| 2009/0257743 A1 | 10/2009 | Chung |
| 2009/0285093 A1 | 11/2009 | Bolt |
| 2009/0313189 A1 | 12/2009 | Sun |
| 2010/0241608 A1 | 9/2010 | Huang |
| 2011/0085567 A1 | 4/2011 | Beecroft |
| 2011/0087952 A1 | 4/2011 | Marin |
| 2013/0077477 A1 | 3/2013 | Daraiseh |
| 2013/0108259 A1 | 5/2013 | Srinivas |
| 2013/0159865 A1 | 6/2013 | Smith |
| 2013/0212285 A1 | 8/2013 | Hoffmann |
| 2013/0250770 A1 | 9/2013 | Zou |
| 2013/0263247 A1 | 10/2013 | Jungck |
| 2013/0294228 A1 | 11/2013 | Ahuja |
| 2014/0025945 A1 | 1/2014 | McGrew |
| 2014/0029451 A1 | 1/2014 | Nguyen |
| 2014/0064100 A1 | 3/2014 | Edwards et al. |
| 2014/0112130 A1 | 4/2014 | Yang et al. |
| 2014/0115706 A1 | 4/2014 | Silva et al. |
| 2014/0129700 A1 | 5/2014 | Mehta |
| 2014/0153572 A1 | 6/2014 | Hampel |
| 2014/0160939 A1 | 6/2014 | Arad |
| 2014/0226467 A1 | 8/2014 | Park |
| 2014/0241345 A1 | 8/2014 | DeCusatis |
| 2014/0245387 A1 | 8/2014 | Colpo |
| 2014/0280834 A1 | 9/2014 | Medved |
| 2014/0325038 A1 | 10/2014 | Kis |
| 2014/0325649 A1 | 10/2014 | Zhang |
| 2014/0371941 A1 | 12/2014 | Keller et al. |
| 2014/0376406 A1 | 12/2014 | Kim |
| 2015/0081762 A1 | 3/2015 | Mason et al. |
| 2015/0112933 A1 | 4/2015 | Satapathy |
| 2015/0195190 A1 | 7/2015 | Shah Heydari |
| 2015/0312658 A1 | 10/2015 | Winzer |
| 2015/0363522 A1 | 12/2015 | Maurya |
| 2016/0043996 A1 | 2/2016 | Syed Mohamed |
| 2016/0119299 A1 | 4/2016 | Amulothu |
| 2016/0142427 A1 | 5/2016 | de los Reys |
| 2016/0165454 A1 | 6/2016 | Li |
| 2016/0330076 A1 | 11/2016 | Tiwari |
| 2016/0337247 A1 | 11/2016 | Yao |
| 2016/0344592 A1 | 11/2016 | Cook |
| 2017/0026225 A1 | 1/2017 | Smith |
| 2017/0026226 A1 | 1/2017 | Grussling |
| 2017/0026243 A1 | 1/2017 | Berner |
| 2017/0026252 A1 | 1/2017 | Dearien |
| 2017/0026276 A1 | 1/2017 | Dearien |
| 2017/0026291 A1* | 1/2017 | Smith .............. H04L 45/128 |
| 2017/0026292 A1 | 1/2017 | Smith |
| 2017/0026349 A1 | 1/2017 | Smith |

* cited by examiner

AUTOMATED COMMUNICATION FLOW DISCOVERY AND CONFIGURATION IN A SOFTWARE DEFINED NETWORK

TECHNICAL FIELD

The present disclosure pertains to systems and methods for automating the configuration of a software defined network ("SDN"). More specifically, but not exclusively, various embodiments consistent with the present disclosure may be applied in operational technology ("OT") networks.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
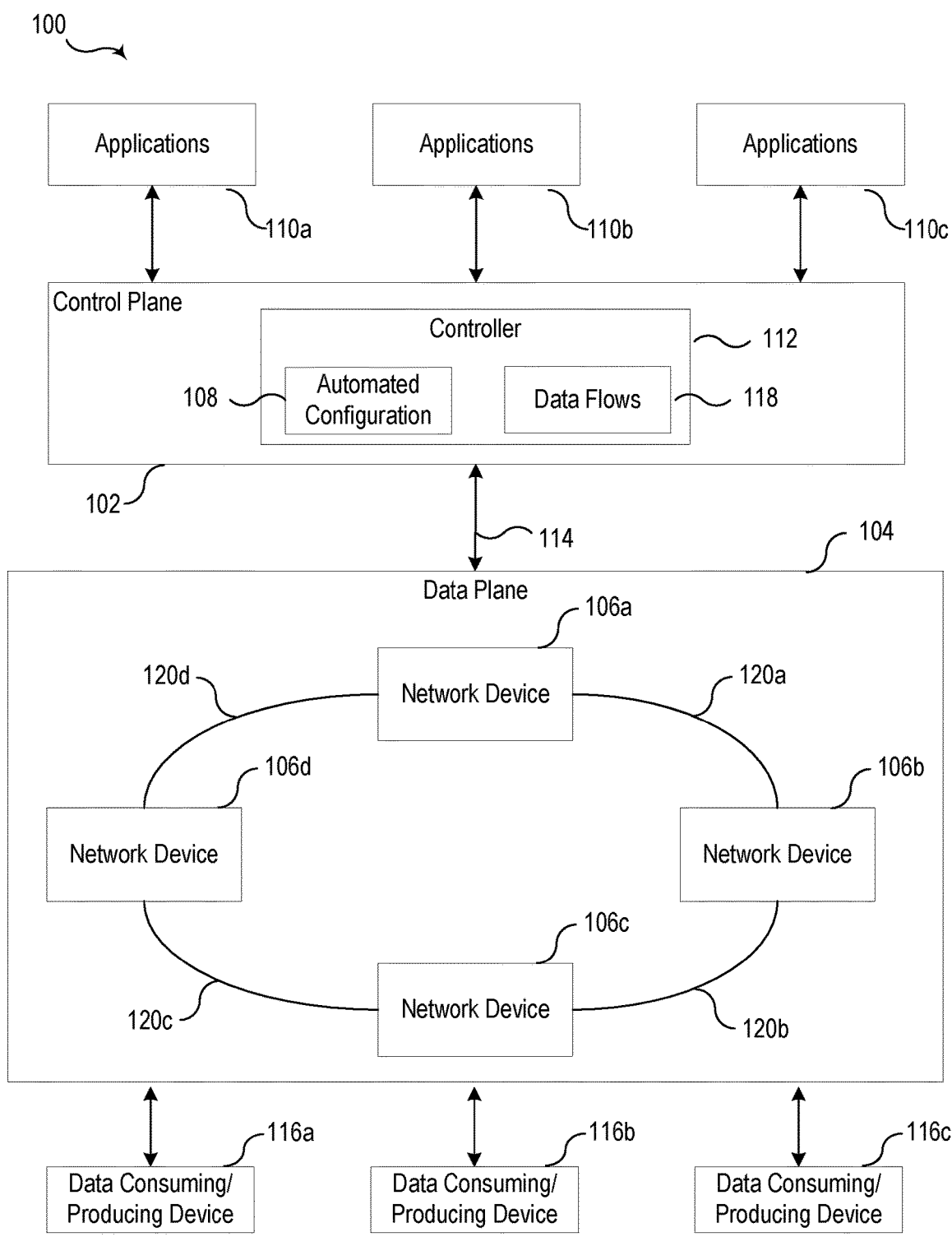
FIG. 1 illustrates a simplified one-line diagram of an electric power transmission and distribution system in which a plurality of communication devices may facilitate communication in a software defined network consistent with embodiments of the present disclosure.

Operational technology (OT) may be integral to the operation of various types of systems, such as electric power systems, telecommunication systems, manufacturing systems, alarm systems, and a variety of other applications. OT networks may manage, monitor, and control a wide range of devices. OT networks may comprise a large number of machine-to-machine communications, and as such, large volumes of data may be generated and transmitted. Management of such networks may present a variety of challenges.

OT networks may utilize a variety of technologies, including software defined network ("SDN") networking technologies. In an SDN, a controller may regulate communications on the network. SDN networking technologies offer a variety of advantages, such as deny-by-default security, latency guarantees, deterministic transport capabilities, redundancy, and fail-over planning, etc. An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to optimize the usage of network resources by creating specific data flows through the communication network. A data flow, as the term is used herein, refers to a set of parameters used to match and take action based on network packet contents. Data flows may permit dedicated paths based on a variety of criteria that offer significant control and precision to operators of the network. In contrast, in large traditional networks, trying to match a network-discovered data path with an application-desired data path may be a challenging task involving changing configurations in many devices. To compound this problem, the management interfaces and feature sets used on many devices are not standardized. Further, network administrators often need to reconfigure the network to avoid loops, gain route convergence speed, and prioritize certain classes of applications.

Significant complexity in managing a traditional network in the context of an OT network arises from the fact that each network device (e.g., a switch or router) includes both control logic and data forwarding logic. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or a Spanning Tree Algorithm (STA) constitute the control logic that determines the path of the packets. Thus, the control plane in a traditional network is distributed in a switching fabric (network device), and as a consequence, changing the forwarding behavior of a network involves changing configurations of many (potentially all) network devices.

In contrast, in an SDN, a controller embodies the control plane and determines how packets (or frames) should flow (or be forwarded) in the network. The controller communicates this information to the network devices, which constitute the data plane. The controller may set forwarding tables in network devices that establish how data is to be routed. This enables centralized configuration and management of a network. In addition to simplifying the management of a network, an SDN architecture may also enable monitoring and troubleshooting features that may be beneficial for use in OT networks. Such features may include, but are not limited to, mirroring a data-selected flow rather than mirroring a whole port; alarming on bandwidth when a communication channel gets close to saturation; providing metrics (e.g., counters and meters for quality of service, packet counts, errors, drops, or overruns, etc.) for a specified flow; and permitting the monitoring of specified applications rather than monitoring based on virtual local area networks (VLAN) or media access control (MAC) addresses.

Configuration of an SDN may be challenging because each communication flow between hosts must be configured or the traffic between the hosts may be blocked due to the deny-by-default security policy. The inventors of the present application have recognized that portions of the configuration of an SDN may be automated in various ways consistent with the present disclosure to reduce the configuration burden. In various embodiments, an operator may provide a set of approved services and/or parameters within an SDN. The SDN may then identify communications that comply with the set of approved services and/or parameters and dynamically create corresponding communication flows.

Operators may identify a set of approved services using a variety of attributes. For example, approved services may be specified using TCP or UDP ports, IP addresses, IP Protocols, EtherTypes, unique identifiers, etc. Communications matching the attributes associated with approved services may be whitelisted. In other words, such communications may be excepted from the deny-by-default security typically imposed in an SDN. The identified approved services may be used to enable communication among devices in an SDN through automated identification and configuration of communication flows in the SDN.

In addition to specifying approved services, an operator may further specify parameters associated with the approved services. For example, a physical location may be a parameter used to limit an approved service. Specifying a physical overlay on an approved service may limit the potential for unauthorized communication by limiting communication to devices within the specified location (e.g., a particular substation in an electric power system).

Still further, systems and methods consistent with the present disclosure may track metrics associated with approved services to identify potential issues (e.g., configuration errors, cabling problems, rogue devices, etc.). For example, if communications match an approved service and approved parameters, but a device is plugged into the wrong switch, a cabling error may be identified and reported to an operator. Despite the cabling error, the communications may still be allowed in some embodiments. Metrics may be ranked by various characteristics so that an operator may address the highest-priority issues first.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a conceptual representation of an SDN system 100 including a control plane 102, a data plane 104, and a plurality of data consumer/producer devices 116a-116c consistent with embodiments of the present disclosure. The control plane 102 directs the flow of data through the data plane 104. More specifically, a controller 112 may communicate with a plurality of network devices 106a-106d via an interface 114 to establish data flows. The controller 112 may specify rules for routing traffic through the data plane 104 based on a variety of criteria.

The data plane 104 includes the plurality of network devices 106a-106d in communication with one another via a plurality of physical links 120a-120d. In various embodiments, the network devices 106a-106d may be embodied as switches, multiplexers, and other types of network devices. The physical links 120a-120d may be embodied as Ethernet, fiber optic, and other forms of data communication channels. As illustrated, the physical links 120a-120d between the network devices 106a-106d may provide redundant connections such that a failure of one of the physical links 120a-120d is incapable of completely blocking communication with an affected network device. In some embodiments, the physical links 120a-120d may provide an N-1 redundancy or better.

The data consuming/producing devices 116a-116c may represent a variety of devices within that produce or consume data. For example, data consuming/producing devices 116a-116c may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 104 using a plurality of data flows 118 implemented by controller 112. Data consuming/producing devices 116a-116c may be embodied by a wide range of devices consistent with embodiments of the present disclosure.

Applications 110a-110c may represent a variety of applications operating in an applications plane. In the SDN architecture illustrated in FIG. 1, controller 112 may expose an application programming interface (API) that applications 110a-110c can use to configure the data plane 104. In addition to an API, other mechanisms may be used to configure the data plane 104. Controller 112 may interface with the data plane 104 and identify communication flows while the control logic resides in the applications 110a-110c. The configuration of controller 112 and applications 110a-110c may be tailored to meet a wide variety of specific needs.

Data consuming/producing devices 116a-116c may transmit information using network devices 106a-106d. The data from data consuming/producing devices 116a-116c may be routed by data plane 104 according to the plurality of data flows 118 specified by controller 112. Network devices 106a-106d may comprise switches, routers, and other equipment to transmit data through data plane 104.

Controller 112 may support automated configuration 108 based on approved services, parameters, and data metrics. Upon detection of a communication associated with an approved service and parameters, controller 112 may generate corresponding data flow(s) 118. In some embodiments, the automated configuration may occur during a commissioning phase, while in other embodiments, automated configuration may be ongoing while system 100 is in operation. Information about automating configuration during a commissioning phase is described in U.S. Pat. No. 9,923,779, which is incorporated herein by reference.

Figure 2:
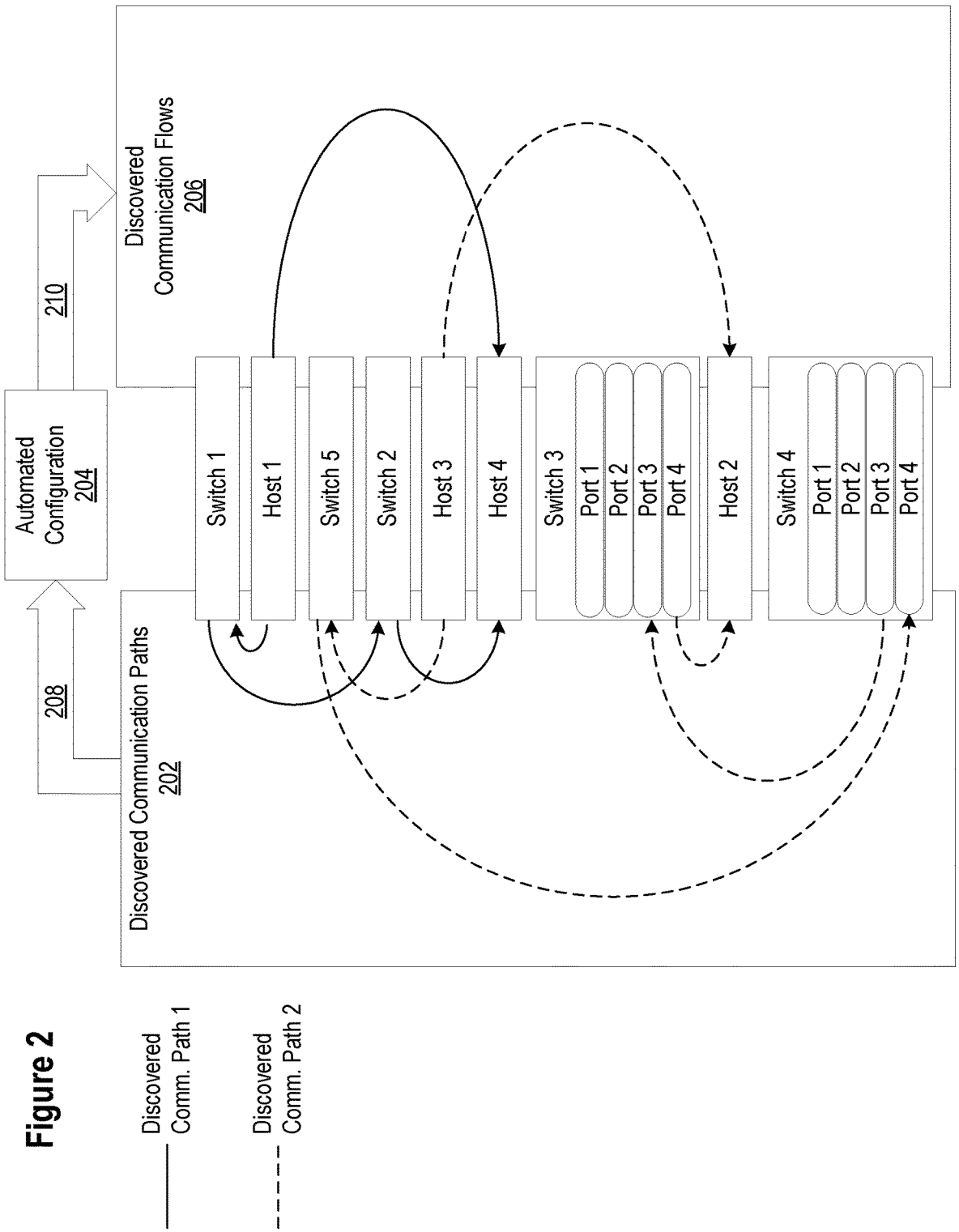
FIG. 2 illustrates a conceptual representation of an SDN architecture including a control plane, a data plane, and a plurality of data consumers/producer devices that may be deployed in an electric power transmission and distribution system consistent with embodiments of the present disclosure.

FIG. 2 illustrates a conceptual representation of existing and discovered communication paths 202 and a plurality of existing and discovered communication flows 206 created through an automated configuration 204 consistent with embodiments of the present disclosure. In the illustrated embodiment, Host 1 communicates with Host 4 through a first discovered communication path, and Host 2 communicates with Host 5 through a second discovered communication path. Automated configuration 204 may identify the communications, confirm that they correspond to approved services, parameters, and data metrics, and create discovered communication flows 206.

In the first communication path, the data packet created by Host 1 may be transmitted to Switch 1, from Switch 1 the packet is transmitted to Switch 2, and the data packet is transmitted from Switch 2 to Host 4. In the second communication path, a data packet created by Host 2 is transmitted to Switch 5, the packet is then transmitted from Switch 5 to Switch 4 (Port 4), the packet is then transmitted from Switch 4 (Port 3) to Switch 3 (Port 3), the packet is then transmitted from Switch 3 (Port 4) to Host 5. Although the traffic flows are illustrated using unidirectional arrows, the traffic flows may be bi-directional.

In various embodiments, the switches may be configured to store the communications flows that detail how each switch transmits packets between hosts. The switches may also store a plurality of attributes (IP, MAC address, and/or any additional unique identifiers, etc.) used to identify packets that fall within each communication flow. The communication flows stored by a particular switch may define the only allowed communications that the switch will forward. In other words, communications that do not satisfy a stored communication flow may be subjected to a deny-by-default security policy.

During the operation of the SDN, routing information and statistics associated with the communication paths 202 may be collected and analyzed in connection with the automated configuration 204, as indicated by arrow 208. In various embodiments, automated configuration 204 may be performed by an SDN controller or another device operable to implement communication flows. Based on the analysis, the plurality of communication flows 206 may be identified and created as indicated by arrow 210. The resulting discovered communication flows 206 are established between Host 1 and Host 4 and between Host 3 and Host 2. The communication flows 206 are not necessarily limited to the specific communication paths 202 discovered during the open mode of operation. When the SDN is in operation, the specific configuration of switches used to connect communicating hosts may be adjusted as needed to account for a variety of conditions (e.g., link failures, network congestion, prioritization, etc.). Failover connections for specific communication flows may be specified by a user.

In some embodiments, the discovered communication paths may be identified during a commissioning phase or in a configuration state. In other embodiments, the discovered communication flows may be identified during the operation of the SDN and based on the criteria established by a user for approved services, parameters, and data metrics. For example, an operator may specify a Generic Object Oriented Substation Event (GOOSE) as an approved service and communication within a particular substation as an approved parameter. Accordingly, if a new device (e.g., Host 1) is connected to an SDN and begins transmitting messages to another device (e.g., Host 4) using GOOSE, and both devices are located in the same substation, a new communication path may be created. In contrast, if a new device is connected to an SDN and begins transmitting messages using another protocol or sending messages to a device in another location, the messages may be blocked because they do not satisfy the operator-specified criteria. Still further, in some embodiments, a proposed communication path may be identified and presented to an operator for acceptance or rejection.

Figure 3:
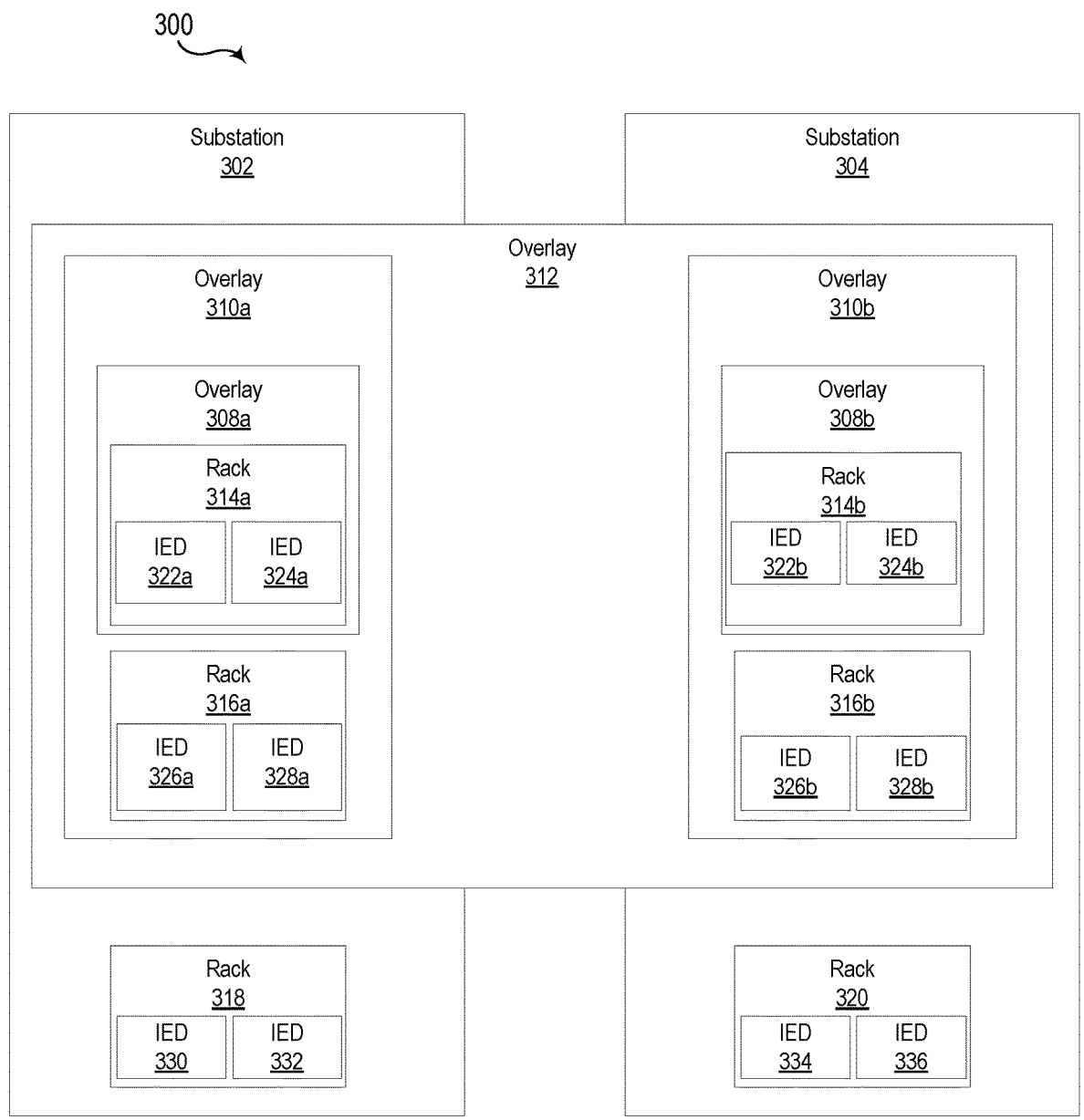
FIG. 3 illustrates a conceptual representation of a system including a plurality of overlays in two substations consistent with embodiments of the present disclosure.

FIG. 3 illustrates a conceptual representation of a system 300 including a plurality of overlays in two substations 302, 304 consistent with embodiments of the present disclosure. Substation 302 includes three racks 310a, 316a, and 318, and each rack includes various IEDs (i.e., rack 314a includes IED 322a and IED 324a, rack 316a includes IED 330 and IED 332, and rack 318 includes IED 330 and IED 332. Similarly, substation 304 includes three racks 314b, 316b, and 320, and each rack includes various IEDs (i.e., rack 314b includes IED 322b and IED 324b, rack 316b includes IED 326b and 328b, and rack 320 includes IED 334 and IED 336).

Certain elements in substation 302 may correspond to elements in substation 304. For example, rack 314a may include the same type of equipment as rack 314b, and the equipment in these racks may perform similar tasks. For example, IED 322a may perform the same task IED 322b, and IED 324a may perform the same task as IED 324b. Consistent deployment of equipment across multiple substations may facilitate design, commissioning, and operation of the substations. Substation 302 may further include rack 318, which includes IED 330 and IED 332, that perform tasks specific to substation 302. Similarly, Substation 304 may include rack 320, which includes IED 334 and 336, that perform tasks specific to substation 304.

Various overlays consistent with the present disclosure may also be implemented consistently in substation 302 and substation 304. For example, overlay 308a may be applied to equipment in rack 314a (i.e., IED 322a and IED 324a) in substation 302, and similarly, overly 308b may be applied to equipment in rack 314b (i.e., IED 322b and IED 324b) in substation 304. Further, overlay 310a may be applied to equipment in rack 314a and rack 316a, and overlay 310b may be applied to equipment is rack 314b and rack 316b.

In addition to overlays effective within a substation (e.g., overlays 308 and 310), overlays may also extend beyond a single facility. Overlay 312 covers equipment in substation 302 and substation 304. In addition to physical location, other types of overlays may also be implemented (e.g., an overlay based on port numbers or other criteria).

Figure 4:
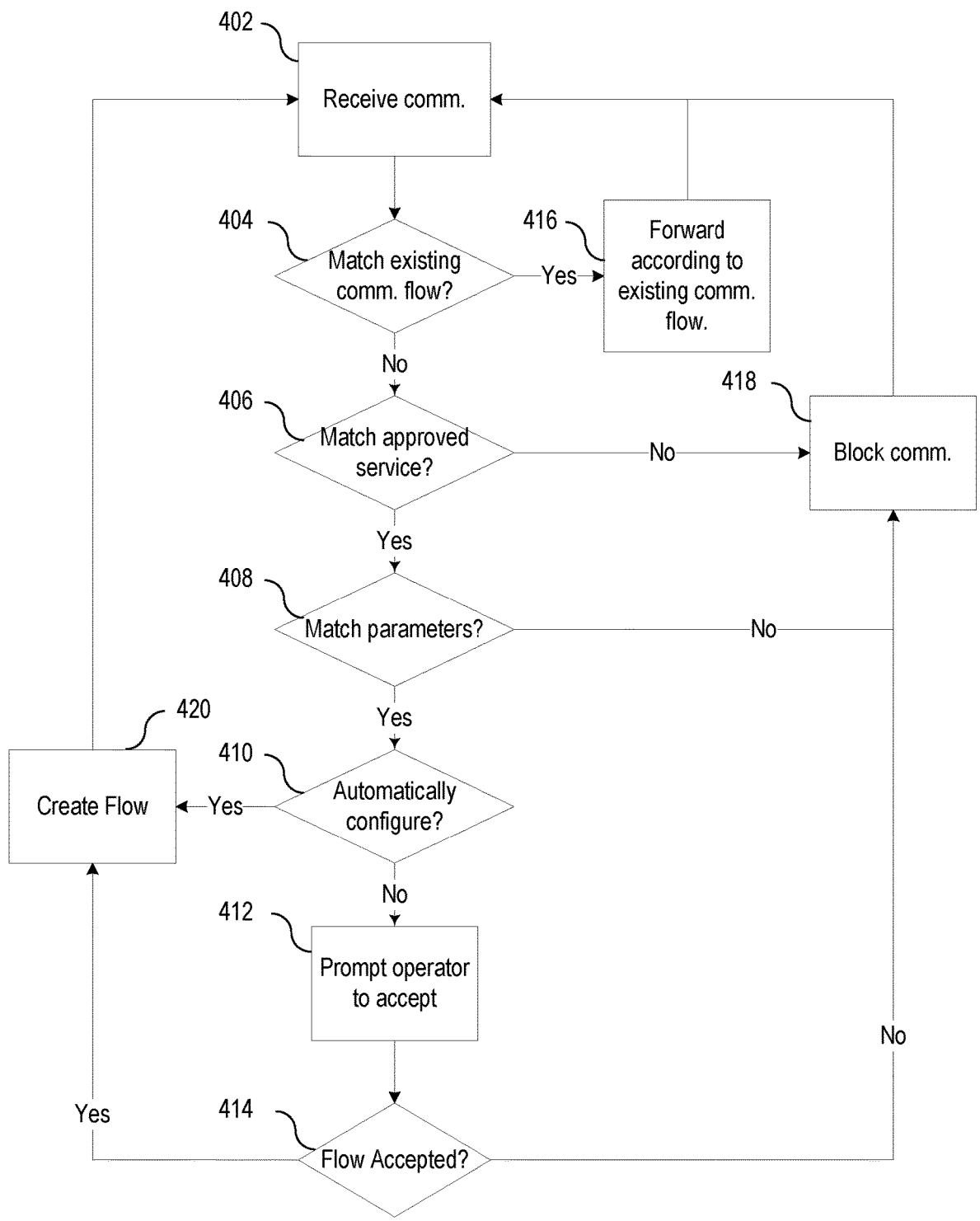
FIG. 4 illustrates a flow chart of method of discovering and configuring communication flows in an SDN consistent with embodiments of the present disclosure.

FIG. 4 illustrates a flow chart of method 400 of discovering and configuring communication flows in an SDN consistent with embodiments of the present disclosure. At 402 a device may receive a communication. At 404, a system implementing method 400 may determine whether the received communication matches an existing communication flow. If a matching communication flow is identified, the communication may be forwarded according to the existing communication flow at 416.

If the received communication does not match an existing communication flow at 404, at 406, a system implementing method 400 may determine if the received communication matches an approved service at 406. Approved services may be specified in various ways (e.g., using TCP or UDP ports, IP addresses, IP Protocols, or EtherTypes) in embodiments consistent with the present disclosure. If the received communication does not match an approved service, the communication may be blocked at 418.

If the received communication matches an approved service at 406, it may be determined whether the received communication matches established parameters set by an operator at 408. For example, a physical location may be a parameter used to limit an approved service. Other parameters may impose other criteria on received parameters. If the received communication does not match established parameters at 408, the communication may be blocked at 418.

If the received communication matches the parameters at 408, at 410 a system implementing method 400 may determine whether to automatically configure a discovered communication flow. Whether to configure a discovered communication flow may be specified by an operator in some embodiments. In other embodiments, certain types of communication flows may be automatically configured while other types of communication flows may not be automatically configured. In some embodiments, an operator may specify criteria to determine whether a discovered flow should be automatically created. For example, automatic creation may occur during a commissioning phase, but communication paths discovered during typical operation may not be automatically configured. A discovered communication flow may be created at 420 based on the determination at 410.

If a communication flow is not automatically configured, an operator may be prompted at 412 to accept a newly discovered communication flow. If an operator accepts the identified communication flow at 414, the newly discovered communication flow may be created at 420. If an operator does not accept the newly discovered communication flow, the communication may be blocked at 418.

Figure 5:
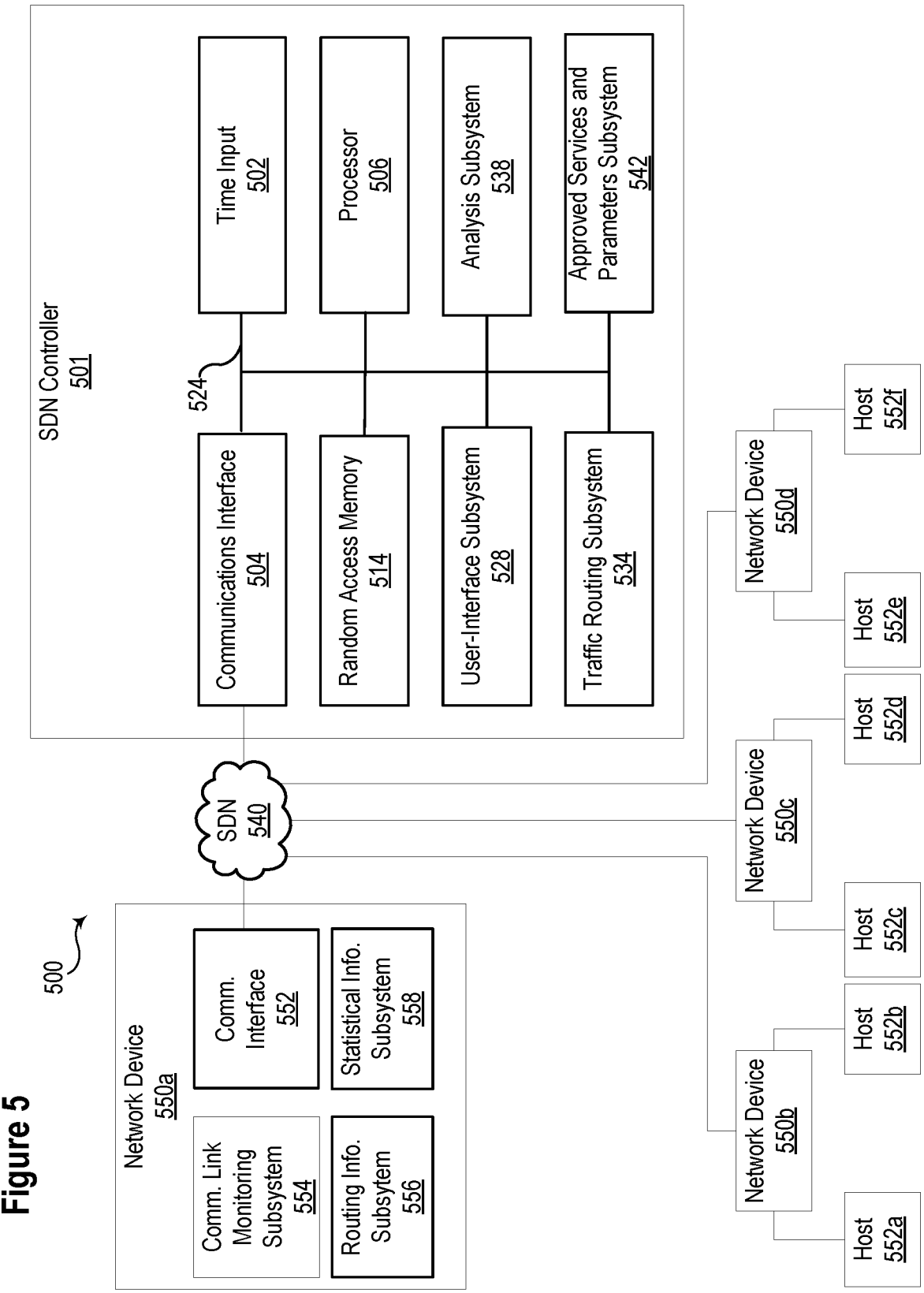
FIG. 5 illustrates a block diagram of a system including an SDN controller, an SDN, a plurality of network devices, and a plurality of hosts consistent with embodiments of the present disclosure.

FIG. 5 illustrates a block diagram of a system 500 including an SDN controller 501, an SDN 540, a plurality of network devices 550a-d, and a plurality of hosts consistent with embodiments of the present disclosure. In some embodiments, system 500 may be implemented using hardware, software, firmware, and/or any combination thereof. Moreover, certain components or functions described herein may be associated with other devices or performed by other devices 552a-f. The specifically illustrated configuration is merely representative of one embodiment consistent with the present disclosure.

SDN controller 501 includes a communications interface 504 configured to communicate with SDN 540 and network devices 550a-d. Communications interface 504 may facilitate communications with multiple devices. SDN controller 501 may further include a time input 502, which may be used to receive a time signal (e.g., a common time reference) allowing SDN controller 501 to apply a time-stamp to received data. In certain embodiments, a common time reference may be received via communications interface 504, and accordingly, a separate time input may not be required. One such embodiment may employ the IEEE 1588 protocol. A data bus 524 may facilitate communication among various components of SDN controller 501.

Processor 506 may be configured to process communications received via communications interface 504 and time input 502 and to coordinate the operation of the other components of SDN controller 501. Processor 506 may operate using any number of processing rates and architectures. Processor 506 may be configured to perform any of the various algorithms and calculations described herein. Processor 506 may be embodied as a general-purpose integrated circuit, an application-specific integrated circuit, a field-programmable gate array, and/or any other suitable programmable logic device.

Instructions to be executed by processor 506 may be stored in random access memory (RAM) 514. Such instructions may include information for processing routing and processing data packets received via communications interface 504 based on a plurality of traffic flows.

A user-interface subsystem 528 may be configured to receive from a user various types of information relating to configuring SDN 540. In some embodiments, the user-interface subsystem 528 may be configured to confirm the creation of automatically detected communication flows in SDN 540. The communication flows to be confirmed may be identified by SDN controller 501 during the operation of SDN 540 in a commissioning mode or while system 500 is in operation. The user-interface subsystem 528 may further be configured to allow a user to transition the SDN 540 between operation in the commissioning mode and an operating mode.

An analysis subsystem 538 may be configured to analyze data relating to traffic transmitted via SDN 540. The data transmitted across SDN 540 may be monitored and analyzed to identify a plurality of communication flows. In various embodiments, network devices 550a-d may collect information about the data transmitted across SDN 540. The data collected by network devices 550a-d relating to traffic on the network may be provided to analysis subsystem 538.

Traffic routing subsystem 534 may be configured to generate a variety of communication flows in SDN 540 based on information received from the analysis subsystem 538 and/or the user interface subsystem 528. The traffic routing subsystem 534 may specify the configuration of a variety of intermediate devices (e.g., routers, switches, multiplexers, etc.), separating communicating hosts. The traffic routing subsystem 534 may be configured to generate physically distinct paths for traffic flows among devices in system 500. For example, host 552f may provide a stream of data to host 552a. A communication flow corresponding to the stream of data may include a path from host 552f to network device 550d, from network device 550d to network device 550b, and from network device 550b to host 552a.

An approved services and parameters subsystem 542 may allow an operator to specify approved services and parameters associated with permitted communications in system 500. An operator may specify services and parameters using a variety of criteria and techniques. The specific criteria reflect a balance between facilitating configuration and maintaining security. While deny-by-default security provides considerable security benefits, it also increases the burden associated with commissioning SDN systems and adding new equipment to such systems. The approved services and parameters may be selected to present minimal risk to system 500 while achieving value from automating the configuration of low-risk communication flows.

Network device 550a is illustrated in greater detail than the other network devices 550b-c, however, network devices 550b-550d may include some or all of the same features and elements. Each of the network devices 550a-d may include a communication interface 552, a communication link monitoring subsystem 554, a routing information subsystem 556, and a statistical information subsystem 558. The communication interface 552 may facilitate communications with multiple devices. In various embodiments, the communication interface 552 may be configured to communicate via a variety of communication links, including Ethernet, fiber optic, and other forms of data communication channels.

The communication link monitoring subsystem 554 may be configured to monitor communications received or transmitted by network device 550a. In some embodiments, the communication link monitoring subsystem 554 may determine a deviation from normal parameters. A variety of parameters may be monitored, such as packet loss, latency, and other metrics relating to data transmission. The communication link monitoring subsystem 554 may be configured to determine whether communication links are stable and reliable and/or to determine if data traffic should be forwarded to avoid unstable or unreliable communication links.

The routing information subsystem 556 may be configured to track the connection of devices and routing of data through network device 550a. In some embodiments, the routing information subsystem may include a routing table, a routing information base, a forwarding table, etc. The routing information subsystem 556 may be configured to provide information to analysis subsystem 538 about data transmitted by network device 550a that may be utilized by analysis subsystem 538 to identify communication flows involving network device 550a.

The statistical information subsystem 558 may be configured to collect statistics relating to data passing through network device 550a. In some embodiments, such statistics may include a variety of types of information, including packet counts, errors, drops, or overruns, etc. The statistical information subsystem 558 may be configured to provide information to analysis subsystem 538 about data transmitted by network device 550a that may be utilized by analysis subsystem 538 to identify communication flows involving network device 550a.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system operable to configure a software defined network (SDN), the system comprising:
   a first communication host;
   a second communication host configured to transmit a stream of information to the first communication host;
   a network in communication with the first communication host and the second communication host, the network comprising a plurality of network devices; and
   an SDN controller in communication with the network, the SDN controller comprising:
      an approved service subsystem to match the communication with an approved service;
      an analysis subsystem configured to identify a communication flow corresponding to the stream of information transmitted by the second communication host to the first communication host; and
      a traffic routing subsystem configured to create the communication flow identified by the analysis subsystem between the second communication host and the first communication host.

2. The system of claim 1, wherein the SDN controller further comprises an approved parameters subsystem to determine that the communication flow corresponding to the stream of information transmitted by the second communication host to the first communication host satisfies an approved parameter.

3. The system of claim 2, wherein the approved parameter comprises a location of at least one of the first communication host or the second communication host.

4. The system of claim 1, wherein the traffic routing subsystem is configured to create the communication flow between the second communication host and the first communication host without user intervention.

5. The system of claim 4, wherein the traffic routing subsystem is configured to create the communication flow between the second communication host and the first communication host without user intervention while operating in a commissioning mode.

6. The system of claim 1, wherein the traffic routing subsystem is configured to prompt an operator to accept the communication flow before creation of the communication flow between the second communication host and the first communication host.

7. The system of claim 1, wherein traffic in the network is subject to a deny-by-default security policy.

8. The system of claim 7, wherein the approved service comprises an exception to the deny-by-default security policy.

9. The system of claim 1, wherein the approved service comprises one of a TCP port, a UDP port, an IP address, an IP protocol, and an EtherType.

10. The system of claim 1, where one of the first communication host or the second communication host comprises an intelligent electronic device in an electric power system.

11. The system of claim 1, wherein the network further comprises a switch, the switch configured to store the communication flow identified by the analysis subsystem between the second communication host and the first communication host and a plurality of attributes to control routing of the stream of information from the second communication host to the first communication host.

12. A method of configuring a software defined network (SDN), comprising:
- providing a first communication host;
- transmitting a stream of information to the first communication host from a second communication host through a network in communication with the first communication host and the second communication host, the network comprising a plurality of network devices;
- providing an SDN controller in communication with the network;
- identifying, using an analysis subsystem of the SDN controller, the stream of information transmitted from a second communication host to the first communication host;
- matching, using an approved service subsystem of an SDN controller, the communication with an approved service;
- identifying, using an analysis subsystem of the SDN controller, a communication flow corresponding to information transmitted by the second communication host to the first communication host; and
- creating, using a traffic routing subsystem of the SDN controller, the communication flow between the second communication host and the first communication host.

13. The method of claim 12, further comprising determining, using an approved parameters subsystem of the SDN controller, that the communication flow corresponding to the stream of information transmitted by the second communication host to the first communication host satisfies an approved parameter.

14. The method of claim 13, wherein the approved parameter comprises a location of at least one of the first communication host or the second communication host.

15. The method of claim 12, further comprising, creating, using the traffic routing subsystem of the SDN controller, the communication flow between the second communication host and the first communication host without user intervention.

16. The method of claim 15, further comprising creating the communication flow between the second communication host and the first communication host without user intervention while operating in a commissioning mode.

17. The method of claim 12, further comprising prompting an operator to accept the communication flow before creating the communication flow between the second communication host and the first communication host.

18. The method of claim 12, wherein traffic in the network is subject to a deny-by-default security policy.

19. The method of claim 18, wherein the approved service comprises an exception to the deny-by-default security policy.

20. The method of claim 12, wherein the approved service comprises one of a TCP port, a UDP port, an IP address, an IP protocol, and an EtherType.

21. The method of claim 12, where one of the first communication host or the second communication host comprises an intelligent electronic device in an electric power system.

22. The method of claim 12, further comprising providing a switch configured to store the communication flow identified by the analysis subsystem between the second communication host and the first communication host and a plurality of attributes to control routing of the stream of information from the second communication host to the first communication host.

* * * * *